(12) United States Patent
Potekhin et al.

(10) Patent No.: US 7,054,820 B2
(45) Date of Patent: May 30, 2006

(54) CONTROL UNIT FOR MULTIPOINT MULTIMEDIA/AUDIO CONFERENCE

(75) Inventors: Sergey Potekhin, Modeine (IL); Eran Knaz, Rishon LeZion (IL); Moshe Carmi, Tel Aviv (IL); Moshe Elbaz, Kiriat Bialik (IL)

(73) Assignee: Polycom Israel, Inc., Petach-Tikva (IR)

( * ) Notice: Subject to any disclaimer, the term of this patent is extended or adjusted under 35 U.S.C. 154(b) by 674 days.

(21) Appl. No.: 10/072,081

(22) Filed: Feb. 6, 2002

(65) Prior Publication Data

US 2002/0123895 A1 Sep. 5, 2002

Related U.S. Application Data

(60) Provisional application No. 60/266,900, filed on Feb. 6, 2001.

(51) Int. Cl.
*H04M 3/56* (2006.01)
*G10L 19/00* (2006.01)

(52) U.S. Cl. .............. 704/275; 704/270.1; 379/202.01

(58) Field of Classification Search ............... 704/270, 704/270.1, 275, 500, 503; 379/202.01, 205; 381/119
See application file for complete search history.

(56) References Cited

U.S. PATENT DOCUMENTS

| | | | |
|---|---|---|---|
| 5,983,192 A | 11/1999 | Botzko et al. | 704/500 |
| 6,141,597 A * | 10/2000 | Botzko et al. | 700/94 |
| 6,674,842 B1 * | 1/2004 | Weinman, Jr. | 379/88.13 |
| 6,765,995 B1 * | 7/2004 | Kobayashi | 379/88.01 |

* cited by examiner

*Primary Examiner*—Abul K. Azad
(74) *Attorney, Agent, or Firm*—Wong, Cabello, Lutsch, Rutherford & Brucculeri, LLP

(57) ABSTRACT

A multipoint controller unit in which the audio signal processing is distributed among several audio ports. The control of the audio signal processing may be centrally or distributively managed by one or more audio controllers. The audio signal processing may include selecting audio streams from a common interface and/or mixing the signals from the common interface. Each audio port may enhance the audio signal and generate control information from the audio signal. The audio ports are synchronized by a common information channel while the audio controllers are synchronized by a common control channel interface. Port fragmentation is reduced since the audio signal processing that relates to an endpoint within a conference is handled by a single audio port.

37 Claims, 9 Drawing Sheets

CONTROL UNIT FOR MULTIPOINT MULTIMEDIA/AUDIO CONFERENCE

CROSS-REFERENCE TO RELATED APPLICATIONS

This application claims priority benefit of U.S. Provisional Patent Application 60/266,900, filed Feb. 6, 2001, having the same title and inventive entity as the present application.

BACKGROUND OF THE INVENTION

1. Field of the Invention

The present invention relates to conferencing technology, and more particularly, to a control unit for an audio/multimedia conference.

2. Prior Art

A control unit for multipoint audio/multimedia conferencing is a device located in a node of a network that receives several audio signals on channels from access ports. The audio signals are processed according to a signaling protocol in the circuit switched or packet switched networks like but not limited to Public Switched Telephone Network (PSTN), Integrated Services Digital Network (ISDN), Asynchronous Transfer Mode (ATM), Internet Protocol (IP), Session Initiation Protocol (SIP), H.320, H.323 or a similar protocol. The control unit for multipoint audio and multimedia conferencing processes the received audio signals and distributes the processed audio streams to the appropriate channels. (An example of such a system is Polycom's MGC-100.)

The current prior art architecture, as detailed in the description of FIGS. 1 to 3, has several limitations. One limitation is that a heavy computational load is placed on a Central Audio Conference Processor (CACP) unit, resulting from handling all participating streams in a conference. In the art the CACP is sometimes referred to as a bridge. However, in the remainder of the specification it is referred to as a CACP. Another limitation is that a heavy input/output load is placed on the CACP unit because the participating streams must be received and transmitted from and/or to each participant codec. These two limitations restrict the size and number of conferences that may be realized on a single processing unit. In addition, because of the inefficient utilization of resources, a situation might occur in which codecs are still available but there is no single CACP with enough resources to set up a conference (resources fragmentation).

SUMMARY OF THE INVENTION

The present invention includes distributing audio signal processing among several audio processing logical units organized in an audio port. In an embodiment, the present invention may include architecture and a method to distribute the audio signal processing functionality of a CACP (i.e., analyzing, enhancing, mixing, etc.) to a decoder portion and an encoder portion. The control functionality of the CACP is done by audio controller. The decoder portion and encoder portion may both be located on the same audio port or in other embodiments they may be separated into an audio input port and by an audio output port. The decoder portion decodes, analyzes and enhances the decoded signal, while the encoder portion handles the mixing and encoding. The audio port along with analyzing and enhancing the decoded signal in the decoder portion, also selects and mixes the proper decoded signals in the encoder portion. Each audio port handles the audio signal of a single participant.

In an embodiment the control of the conference is centralized. By utilizing centralized control and distributed processing, the conference control within the system can be performed in a unique logical unit, which can be the audio controller. All audio signal processing needs of a participant may be taken care of by an audio port. In an alternative embodiment, the management of the conference is distributed among several audio controllers. In an embodiment, there may be one audio controller for each audio port. In an embodiment, (e.g., embodiments having centralized conference management), the audio controller performs only conference control and does not perform any audio signal processing.

Other features and advantages of the present invention will become apparent upon reading the following detailed description of the embodiments with the accompanying drawings and appended claims.

DETAILED DESCRIPTION OF THE INVENTION

Figure 1:
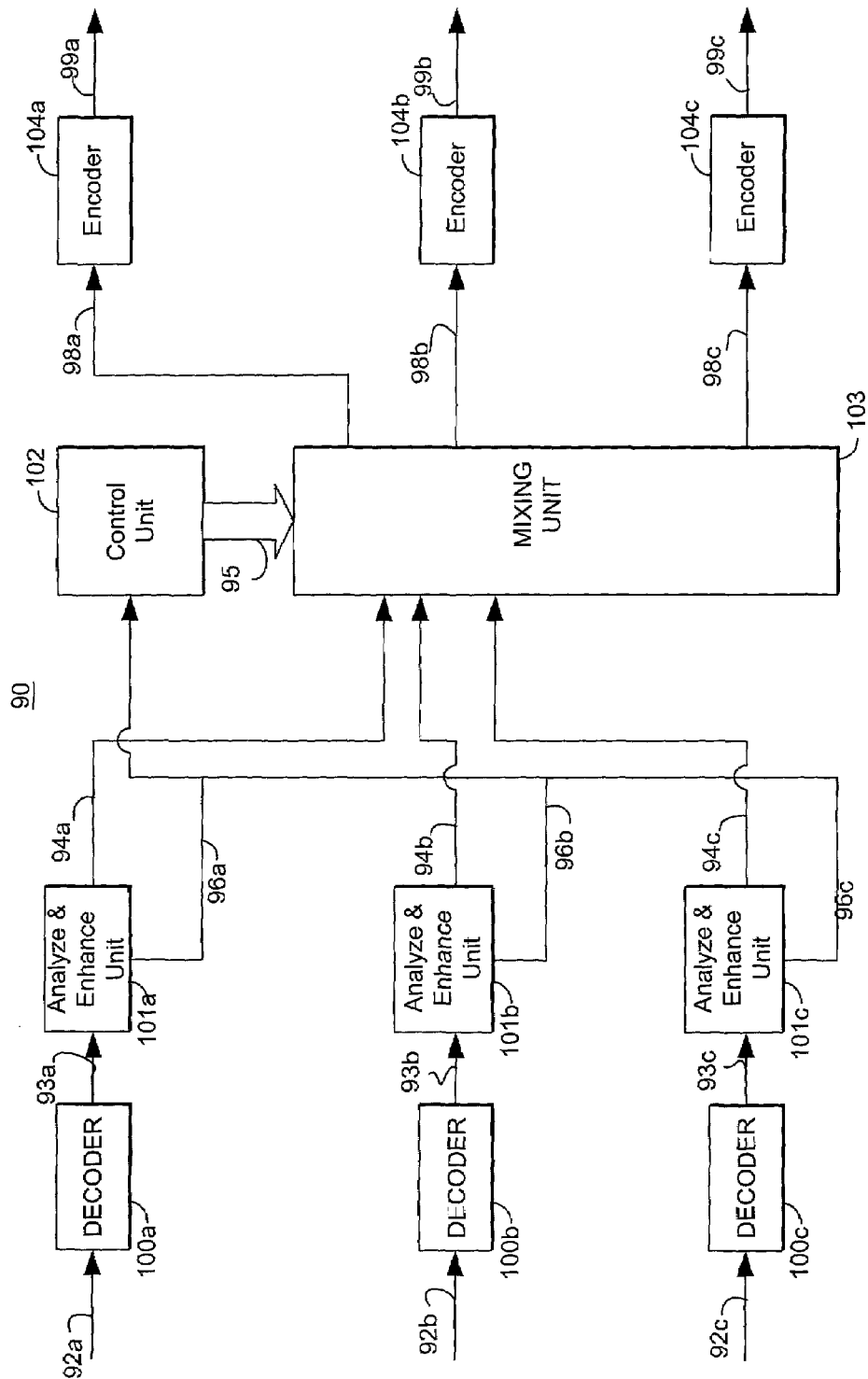
FIG. 1 is a block diagram of a prior art generic audio conference system.

Referring now to the drawings, in which like numerals refer to like parts throughout the several views, exemplary embodiments of the present invention are described.

FIG. 1 is a block diagram of a prior art generic audio conference system 90, that includes a plurality of: compressed audio streams 92a–c, decoded audio streams 93a–c, enhanced audio streams 94a–c, control instructions 95, control information 96a–c, mixed audio streams 98a–c, mixed compressed audio streams 99a–c, decoders 100a–c, analyze and enhance units 101a–c, a control unit 102, a mixing unit 103, and encoders 104a–c. Three units, a–c, of each item are shown by way of example and for convenience of presentation numbers other than three may also be used in an audio conference system.

Audio communications originate and end at what are referred to in this specification as endpoints. Audio conference system 90 is also referred to as a bridge (not to be confused with a CACP). Each endpoint of this specification may include one or more microphones or other means of receiving sound and/or one or more speakers or other means of generating sound. Some endpoints may only originate audio signals (similar to a radio station), while other endpoints may only receive audio signals (similar to a listener of a radio station). Yet, other endpoints may both originate and receive audio signals (similar to a telephone). Audio conference system 90 manages audio conferences in which many people are able to participate. In this specification the word "participants" refers to the hardware and/or software representing a person participating in the conference. A participant is a type of endpoint. A conference may also include endpoints that are not participants because they do not represent any particular person, such as an endpoint that generates background music.

Decoders 100a–c decode compressed audio streams 92a–c. The decoding may be performed according to compression methods such as, but not limited to, G.711, G.723, G.728, G.729, and Motion Picture Expert Group (MPEG) audio compression standards. Analyze and enhance units 101a–c perform a stream analysis on decoded (or decompressed) audio streams 93a–c using a set of algorithms for analyzing the decoded audio streams 93a–c and a stream enhancement enhancing their qualities, including, for example, International Telecommunications Union (ITU) G.165 (Echo canceling), Dual Tone Multi-Frequency (DTMF) suppression, etc. The functionality of an analyze and an enhance units 101a–c may be divided between two logical units; analyze unit and enhance unit. The stream enhancement creates enhanced audio signals 94a–c. The stream analysis creates control information 96a–c such as, but not limited to, VAD (Voice Activity Detection), signal energy, and signal quality measures. Control unit 102 receives all control information 96a–c from the stream analysis of analyze and enhance units 101a–c, determines which participants (not shown) are currently active, and creates control instructions 95. Mixing unit 103 receives control instructions 95 from control unit 102 and enhanced audio streams 94a–c from all the active participants (not shown). Mixing unit 103 mixes the enhanced audio streams 94a–c based on control instructions 95 and supplies a number of uncompressed mixed audio streams 98a–c according to the number of participants. Consequently, the number of participants is limited by the capacity of control unit 102 and mixing unit 103. Encoders 104a–c encode (compress) the mixed audio streams 98a–c for participants (not shown), based on the communication standard, such as G.711, G.723, G.728, G.729, and MPEG audio compression standards, to supply each participant with one of mixed compressed audio streams 99a–c.

Figure 2:
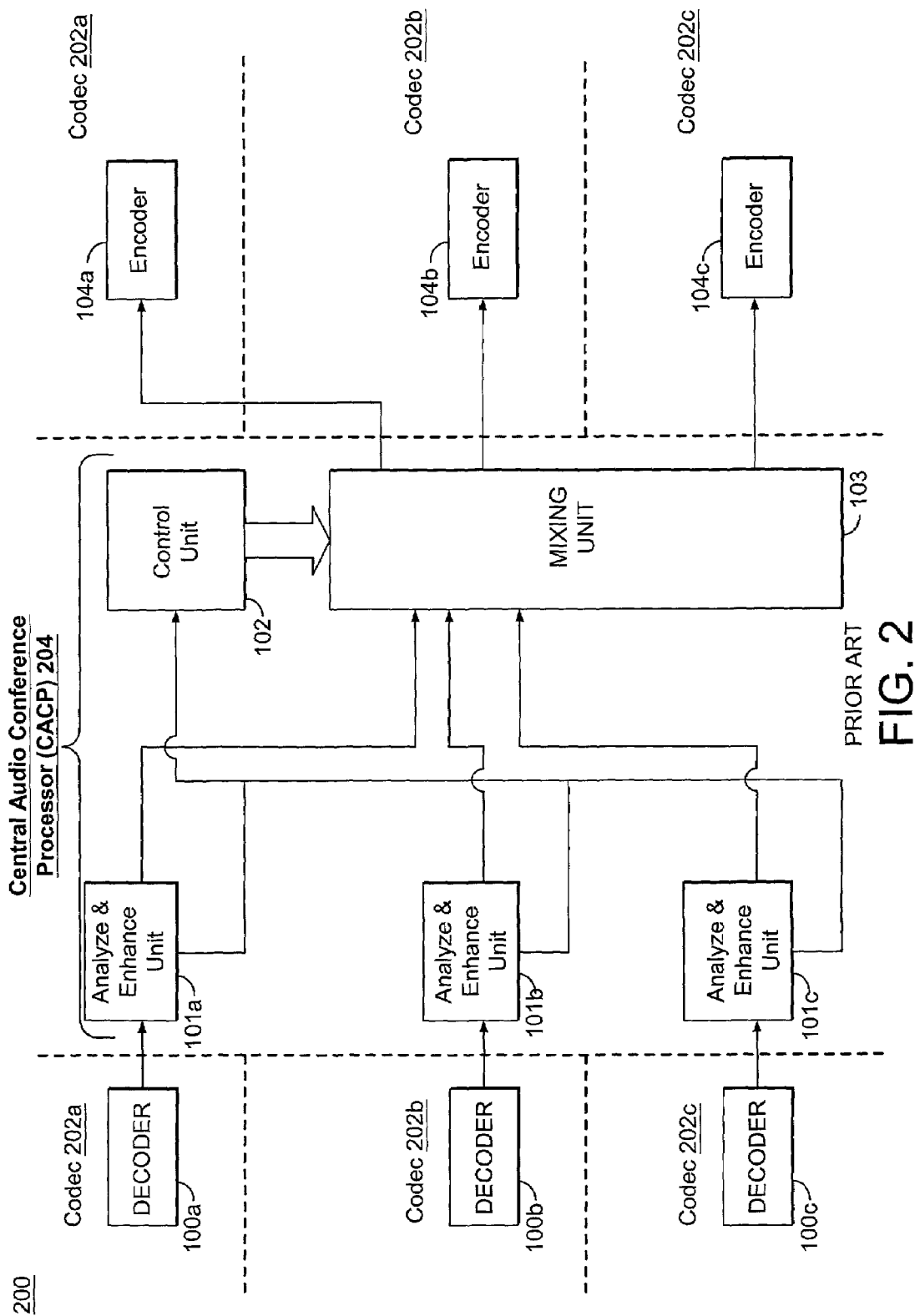
FIG. 2 is a block diagram of an embodiment of the prior art audio conference system of FIG. 1.

FIG. 2 is a block diagram of a prior art audio conference system 200, which is an embodiment of audio conference system 90 of FIG. 1. System 200 includes codecs 202a–c and a CACP 204. Codecs 202a–c include generic decoders 100a–c and generic encoders 104a–c. All other generic logical units (e.g., analyze and enhance units 101a–c, control unit 102, and mixing unit 103) are located in CACP 204. Consequently, the processing load on CACP 204 limits the number of participants and the size of the conference via an audio conference system, which uses the FIG. 2 architecture.

Figure 3:
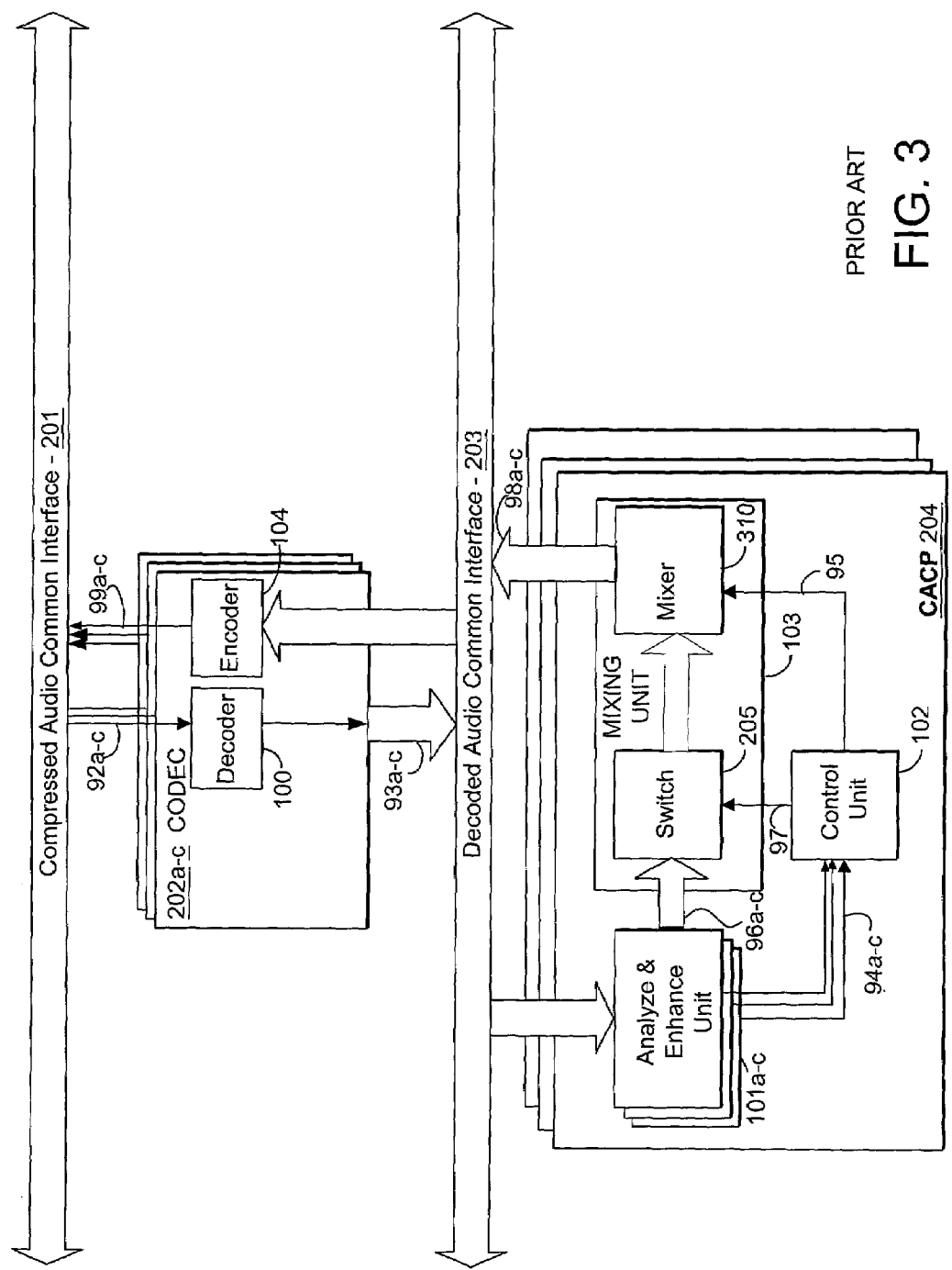
FIG. 3 is a flow diagram of the prior art audio conference system of FIG. 2.

FIG. 3 shows the flow of the audio streams in system 200, including a Compressed Audio Common Interface (CACI) 201, codecs 202a–c, a Decoded Audio Common Interface (DACI) 203, and CACP 204 having analyze and enhance unit 101a–c, control unit 102 and mixing unit 103, which comprises a switch 205 and a mixer 310.

The paragraphs that follow refer to a Multipoint Control Unit (MCU) as an example of a control unit of the present invention. The control unit may be used for audio conferencing communications in situations where an audio bridge is used instead of an MCU.

Compressed audio streams 92a–c, from all endpoints that are connected to an MCU, are transferred over Compressed Audio Common Interface (CACI) 201. An endpoint sends compressed audio streams (or signals) 92a–c to an MCU. Compressed audio streams 92a–c are routed through CACI 201 to codecs 202a–c that were previously allocated to the endpoints by the host (not shown). Decoders 100a–c decode the compressed audio streams 92a–c based on a prescribed communication standard and transfer the decoded audio streams 93a–c to Decoded Audio Common Interface (DACI) 203.

CACP 204 retrieves decoded audio streams 93a–c from DACI 203. Decoded audio streams 93a–c are from all the endpoints associated with a conference that are assigned to CACP 204 by the host (not shown). Decoded audio streams 93a–c are analyzed and enhanced by analyze and enhance units 101a–c of CACP 204. Each of analyze and enhance units 101a–c is assigned to a single participant (not shown). Control information 94a–c from analyze and enhance units 101a–c is sent to control unit 102, and enhanced audio steams 96a–c are sent by analyze and enhance units 101a–c to mixing unit 103. Control unit 102 sends control instructions 95 and 97 that control switch 205 and mixer 310. Control instructions 95 and 97 are based on control information 94a–c and the requests of the conference participants, which are received via the host (not shown).

Mixing unit 103 mixes selected enhanced audio streams 96a–c and sends mixed audio streams 98a–c to DACI 203. Mixed audio streams 98a–c to each codec 202 may not include signals that originated from the same codec. Switch 205 selects a subset of enhanced audio streams 96a–c according to control instructions 97. The subset represents the most dominant streams within the conference or those requested specially from the host (not shown). The subset of enhanced audio streams 96a–c are then transmitted to mixer 310. Mixer 310 mixes these streams and produces a plurality of mixed streams 98a–c, each mixed stream being sent to at least one appropriate participant within the conference. Each mixed stream 98a–c may exclude the audio signals that originated from the same participant. The appropriate one or more of codecs 202a–c then retrieves the appropriate mixed stream 98a–c. Then encoders 104a–c encode mixed streams 98a–c and send encoded or compressed audio streams 99a–c via CACI 201 to the appropriate endpoints (not shown). In the above example, each of codecs 202a–c handles a single participant's audio stream, while CACP 204 handles one conference. The connection between codecs 202a–c and CACP 204 is made by the system backplane, which includes CACI 201 and DACI 203. Since the analyze and enhance, mixing, and control operations are centralized by CACP 204 the capacity of CACP 204 limits the number of participants that can be included in a conference.

Figure 4:
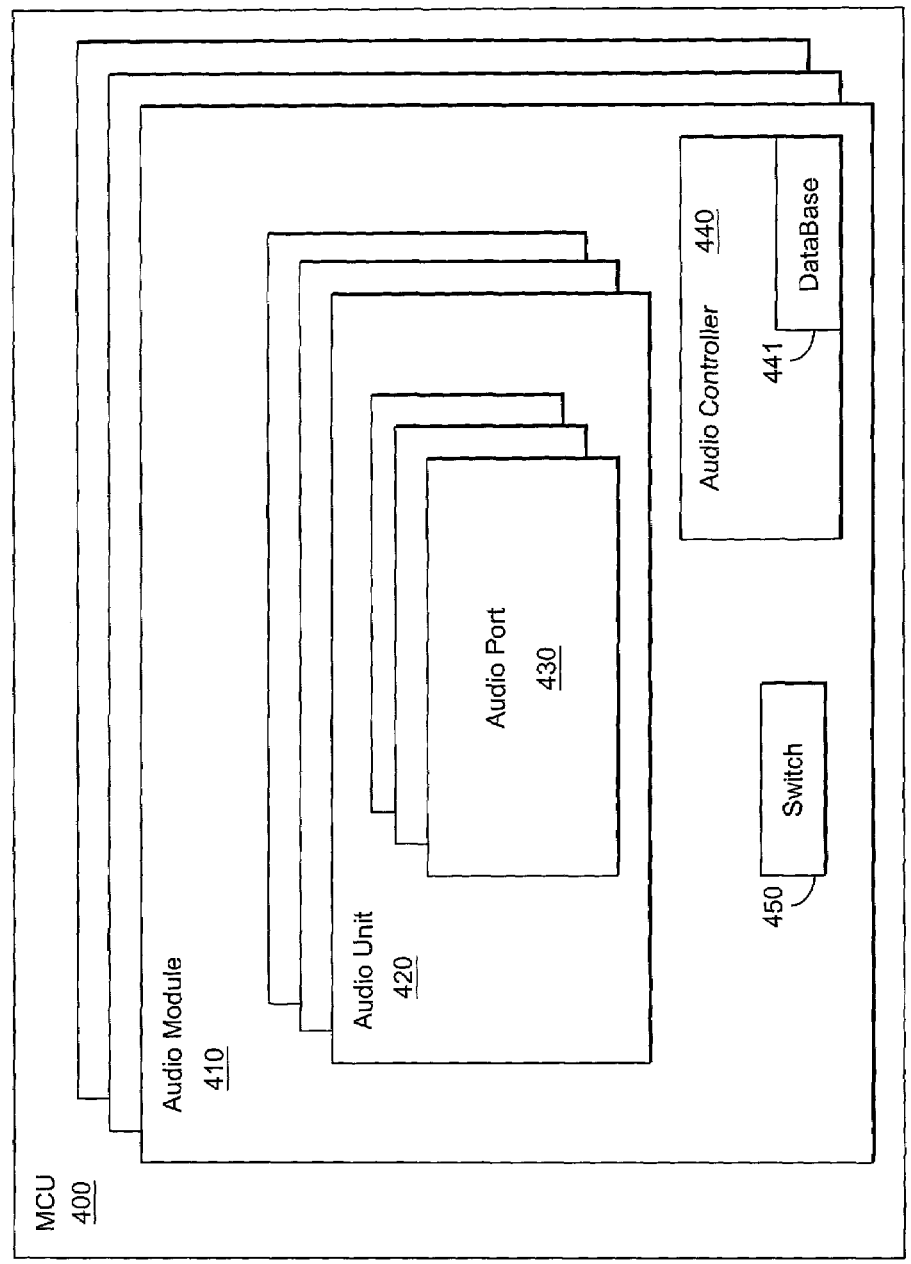
FIG. 4 is a diagram of the layers of one embodiment of a multimedia conference unit according to the invention.

FIG. 4 shows the layers of an exemplary embodiment of the invention having an MCU 400, which includes at least one audio module 410. Each audio module 410 includes at least one audio unit 420, an audio controller 440 with its database (DBc) 441, and a switch 450. Each audio unit 420 includes at least one audio port 430. Audio unit 420 and audio controller 440 can be implemented as software that runs on a Digital Signal Processor (DSP), such as the TM320C62x family produced by Texas Instruments.

In some embodiments, switch 450 may be in audio module 410, serving all audio ports 430 within its audio module 410, as in FIG. 4. In other embodiments switch 450 is distributed among each one of audio ports 430, as in FIG. 5. In other embodiments a single switch 450 and audio controller 440 may serve all audio ports 430.

Figure 5:
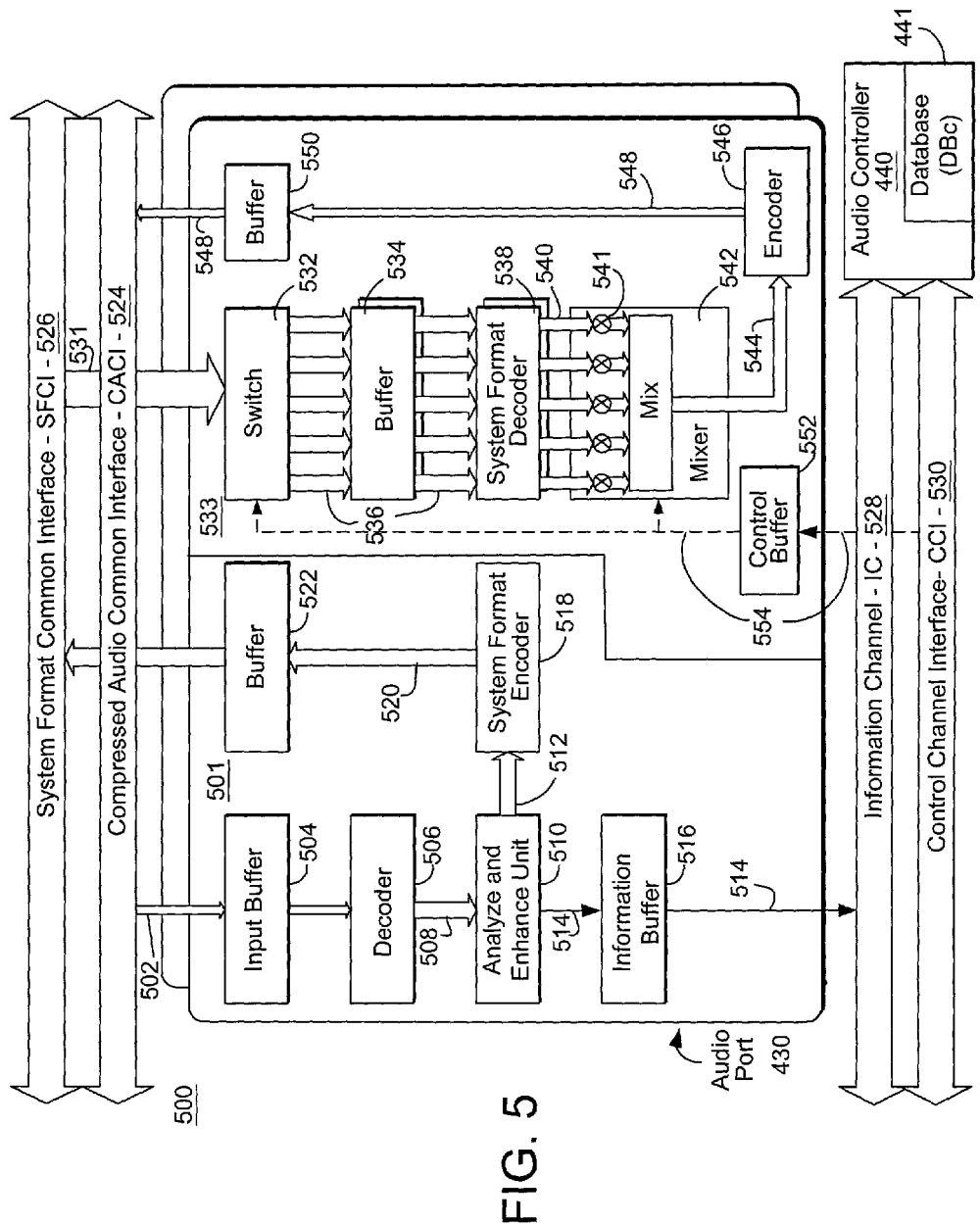
FIG. 5 is a block diagram of another embodiment of a multimedia conference unit according to the invention.

FIG. 5 is a block diagram of a portion of one embodiment of an audio system 500 according to the invention, including at least one audio port 430, audio controller 440 with its database (DBc) 441, a CACI 524, a System Format Common Interface (SFCI) 526, an Information Channel (IC) 528, and a Control Channel Interface (CCI) 530. Each audio port 430 includes a decoder portion 501 and an encoder portion 533. Decoder portion 501 may include an audio stream 502, an input buffer 504, a decoder 506, a decoded audio stream 508, an analyze and enhance unit 510, an enhanced audio signal (or audio stream) 512, control information 514, an information buffer 516, a system format encoder 518, a formatted audio signal 520 and a buffer 522. Encoder portion 533 may have selected signals 531, a switch 532, bank of buffers 534, streams 536, a system format decoder 538, decoded streams 540, a mixer 542, a mixed signal 544, an encoder 546, a compressed signal 548, a buffer 550, a control buffer 552, and control instructions 554.

Each audio port 430 handles the audio signal processing of a single participant (not shown) from beginning to end with the possible exception of the control of the signal processing, which could be managed centrally. Decoder portion 501 may decode, enhance, analyze, and/or format an audio signal. Decoder portion 501 also may extract control information 514 from decoded audio stream 508. Encoder portion 533 processes the audio signal by selecting a subset of audio signals based on control information 514 that originated from various audio ports and that was processed by audio controller 440. Encoder portion 533 may further mix decoded streams 540 into mixed signal 544 and encode mixed signals 544 according to the audio compression standard of the assigned endpoint. Each audio port 430 also includes a port processing unit (not shown) with its database (DBp) that receives the commands from the host (not shown) and audio controller 440 and manages the activity of audio port 430. The operation of the port processing unit is described below in conjunction to FIG. 6. Decoder portion 501 and encoder portion 533 may communicate with one another indirectly via SFCI 526.

Other embodiments of the present invention may use a Distributed Audio Port (DAP) configuration (not shown). In an embodiment that uses the DAP decoder portion 501 and encoder portion 533 are located in two separate logical units. Decoder portion 501 is located in an audio input port and encoder portion 533 is located in an audio output port. Each port, e.g., each audio input port and audio output port, has its own port-processing unit that manages its activity. Regarding decoder portion 501, input buffer 504 selects audio stream 502, which could be compressed and which originates from a corresponding participant (not shown), from CACI 524. Decoder 506 decodes audio stream 502 based on the compression standard of audio stream 502 and transfers decoded audio stream 508 to analyze and enhance unit 510. If audio stream 502 is not compressed, decoder 506 is bypassed. Analyze and enhance unit 510 may analyze the signal using algorithms such as DTMF, signal energy calculations VAD, etc. Analyze and enhance unit 510 also enhances decoded signal 508, and may perform operations including, but not limited to, noise reduction, echo cancellation according to ITU G.165 standard, and DTMF suppression. The enhance operation of analyze and enhance unit 510 improves the quality of the decoded audio stream 508, but is not mandatory. Other exemplary embodiments of the present invention may give up the enhance feature of the analyze and enhance unit 510. Analyze and enhance unit 510 may produce two type of outputs: control information 514 output to information buffer 516 and/or an enhanced audio signal 512 output to system format encoder 518. In an embodiment that does not enhance the decoded audio stream 508, the output of analyze and enhance unit 510 is the same as the decoded audio stream 508. Control information 514 may include parameters and indications such as signal energy, Voice Activity Detection (VAD), and DTMF. Control information 514 may also include indications and commands originating from the host (not shown) passed via the audio port 430 to audio controller 440, such as mute (the participant can not be selected), exclusive (the only speaker), normal, force (must be selected), and music. Control information 514 may be sent via information buffer 516 to IC 528. IC 528 broadcasts control information 514 from audio ports 430 and/or the host (not shown) to audio controller 440 (FIG. 4) in every audio module 410 (FIG. 4). The indications and commands in control information 514 may be sent via IC 528 in a packet mode with several fields including, for example, a header with the participant's name, the actual results from analyze and enhance unit 510, the identification of the output data from buffer 522 in SFCI 526, the connection status from the host (not shown), the ID number of audio port 430 and the ID number of audio module 410. The format and type of information used for the identification of output data from SFCI 526 is dependent upon the embodiment of SFCI 526. For example, for a TDM bus a time slot may be used for the identification of output data, while for an ATM bus a source ID number may be used for the identification of output data.

Analyze and enhance unit 510 sends the enhanced audio signal 512 to system format encoder 518, which encodes the enhanced audio signal 512 into, for example, a system format based on a standard such as G.711 or uncompressed information in Pulse Code Modulation (PCM), or some other proprietary encoding either lossy or lossless. Formatted audio signal 520 is transferred via buffer 522 to SFCI 526. In other exemplary embodiments system format encoder 518 is not used and enhanced audio signal 512 is transferred directly to buffer 522. Regarding encoder portion 533, switch 532 retrieves selected signals 531 from SFCI 526 based on one or more commands or control instructions 554 from audio controller 440. Selected signals 531 are received from conference participants and may be heard by the participant who receives the audio signal from audio port 430. The implementation of switch 532 depends on the embodiment of SFCI 526. For example, if SFCI 526 is a Time Division Multiplexing (TDM) bus, then switch 532 can be an Ambassador T 8100 manufactured by Lucent Technologies.

Each audio port 430 may have its own separate switch 532, as in FIG. 5 in addition to or instead of switch 450 (FIG. 4). In other embodiments, switch 532 may be replaced by switch 450, which is a central switch for the entire audio module 410. In such embodiment, switch 450 controls the input for all audio ports 430 that are located on the same audio module 410.

The output of switch 532 may include multiple streams 536. Each one of streams 536 may correspond to a participant (not shown) selected to be part of the audio mix. Streams 536 are transferred via bank of buffers 534 (having one buffer for each of streams 536) to bank of system format decoders 538. System format decoders 538 decode each one of streams 536 to extract the format information associated with the formatting performed by system format encoder 518. Decoded streams 540 are then transferred to mixer 542, which in turn mixes its input signals (streams 540) to one mixed signal 544 and sends mixed signal 544 to encoder 546. System format decoder 538 is matched to system format encoder 518. In an embodiment that is not using system format encoder 518 there is no need for system format decoders 538.

Essentially, mixer 542 receives and mixes selected signals 531. In one embodiment, inputs to mixer 542 includes five channels 541 (one for each decoded stream 540), where each channel 541 has an adjustable gain. For example, if all participants have the same status, then all channels 541 are allocated the same gain. In another example, mixer 542 can have three levels of gain such as high, medium, and low. These three gain levels may be appropriate for a lecture, wherein the lecturer will be switched to the high gain channel, the person that gets the permission to ask questions will be switched to the medium level gain channel, and the rest will be switched to the low level gain channel. Any method of controlling the gain can be used. In one embodiment, the gain of each of streams 540 is changed by sending a "change entry's gain command" to mixer 542. In another embodiment, each of streams 540 is switched to an appropriate entry to thereby change the gain. Gain control methods are further discussed below in reference to FIG. 7. Mixer 542 can be implemented by placing additional software running in audio unit 410's DSP (not shown) or by using hardware embedded in a Field Programmable Gate Array (FPGA) or an Applications Specific Integrated Chip (ASIC), for example. Encoder 546 encodes the output of mixer 542, according to the required audio compression protocol. Compressed signal 548 is transferred via buffer 550 to CACI 524, and then to the final destination, which may be a remote participant (not shown). In an embodiment, which uses an uncompressed audio common interface instead of CACI 524, there is no need for encoder 546 and mixed signal 544 is transferred directly to CACI 524 via buffer 550.

In an embodiment, the only unit that is aware of the conference as an entity is audio controller 440. Each of audio ports 430 concentrates on an endpoint's audio processing and does not need to be aware of the conference as an entity. Audio controller 440 may be used to centrally manage the conference. Alternatively, the conference management may be distributed among several audio controllers 440. For example one controller may be on each audio module 410. All controllers receive the same data at the same time and perform the same process but control only the audio ports 430 located on the same audio module 410. The functionality achieved by using multiple logical units for audio controller 440 or using a single logical unit is the same. Synchronization of all audio controllers 440 is achieved through the broadcast nature of IC 528, because by broadcasting information or a signal every audio controller 440 receives the same information at the same time.

All audio ports 430 broadcast special information streams via IC 528 such as control information 514 from analyze and enhance unit 510 and communication commands and indications from the host (not shown). Each audio port 430 broadcasts control information 514 that is relevant to its own operation. Control information 514 of audio port 430 may include commands such as mute, force, and exclusive. Audio controller 440 stores control information 514 and communication commands and indications in its database 441. Audio controller 440 later utilizes control information 514 and the communication command and indications in its database 441 to make decisions. Database 441 may be dynamically divided into a plurality of conference Data bases (DBcs) one for each conference.

When processing a conference in which all participants have the same status (e.g., a common conference among participants having the same priority), audio controller 440 receives control information (e.g., control information 514 or control information from the host) via IC 528, updates its database 441, and then searches for the set number of the dominant speakers in the conference. Audio controller 440 then controls switch 532 and/or mixer 542 of each audio port 430 being used for the conference to generate an appropriate mix. For example, the set number of speakers for which audio controller 440 searches may be five participants. When processing a conference that is a lecture, audio controller 440 may receive the information via IC 528, update its database 441, and then search for the dominant speaker (e.g., the lecturer).

In one exemplary embodiment, audio controller 440 may be a single dedicated logical unit within MCU 400. Another embodiment may have multiple audio controllers 440. For example, audio controller 440 may include one controller on each audio module 410. MCU 400 may be configured such that all audio controllers 440 receive the same data at the same time and perform the same process but control only audio ports 430 located on the same audio module 410.

Audio controller 440 may have an initial setup phase in which it is configured by the host (not shown) or by other means to centrally or distributively manage the conference. After setup, audio controller 440 repeatedly performs three tasks during the conference. Audio controller 440 receives control information 514 from audio ports 430 within MCU 400 and stores this information in its database 441. In addition, audio controller 440 receives conference wide commands from the host such as "open conference," "change conference parameters," and "close conference." Audio controller 440 makes decisions based on updated database 441, conference by conference. Then, audio controller 440 instructs the appropriates audio ports 430 via CCI 530.

Since audio controllers 440 receive the same information at the same time, the broadcast nature of IC 528 synchronizes audio controllers 440. In an exemplary embodiment, the present invention provides audio data sharing through SFCI 526. SFCI 526 may be configured such that communication via SFCI 526 results in audio data sharing between audio ports 430 residing on the same chip, audio ports 430 residing in different chips, and even audio ports 430 in different audio modules 410 or MCUs 400. Moreover, since the audio port 430 handles the audio signal processing needs of an endpoint, removing or reducing resource fragmentation, the maximum number of participants in a conference is greater than if part of the audio signal processing is handled centrally, because as long as there is a free port a participant may be added to a conference.

Logical common interfaces, such as CACI 524 and Control Channel Interface (CCI) 530 connected to all audio ports 430 within MCU 400, can be implemented, for example, by any one of, any combination of, or all of TDM bus, Asynchronous Transfer Mode (ATM) bus, shared memory, direct connection, Local Area Network (LAN), wireless, and/or switching technology. Logical common interfaces, such as IC 528 and SFCI 526, may be connected to all audio ports 430 and should have broadcasting capabilities, for example TDM, ATM, and LAN. Audio controller 440 uses CCI 530 and control buffer 552 to control switch 532 and mixer 542. The host (not shown) may set the gain of mixer 542 via audio controller 440, CCI 530, and control buffer 552.

Other embodiments of the present invention may combine the four common interfaces, SFCI 526, CACI 524, IC 528, and CCI 530 into a single common interface with a broadcasting capability. Other embodiments may combine them into two common interfaces, one with broadcasting capability and the other without broadcasting capability.

The broadcast nature of IC 528 also allows for control information to flow from the host (not shown) through audio ports 430 to each audio controller 440. Distributing control information via broadcasting enables the command channel to be participant orientated. Any command related to a particular participant is sent to that participant's audio port 430, which executes the command and may broadcast the command or its subsequent result through IC 528 to all audio controllers 440.

In an alternate embodiment, decoder 506 may include multiple decoders and/or may be of the same type as decoders 100*a–c*. Analyze and enhance unit 510 may include multiple analyze and enhance units and/or could be of the same type as analyze and enhance units 101*a–c*. Encoder 546 may include multiple encoders and/or may be of the same type as encoders 104*a–c*.

Figure 6:
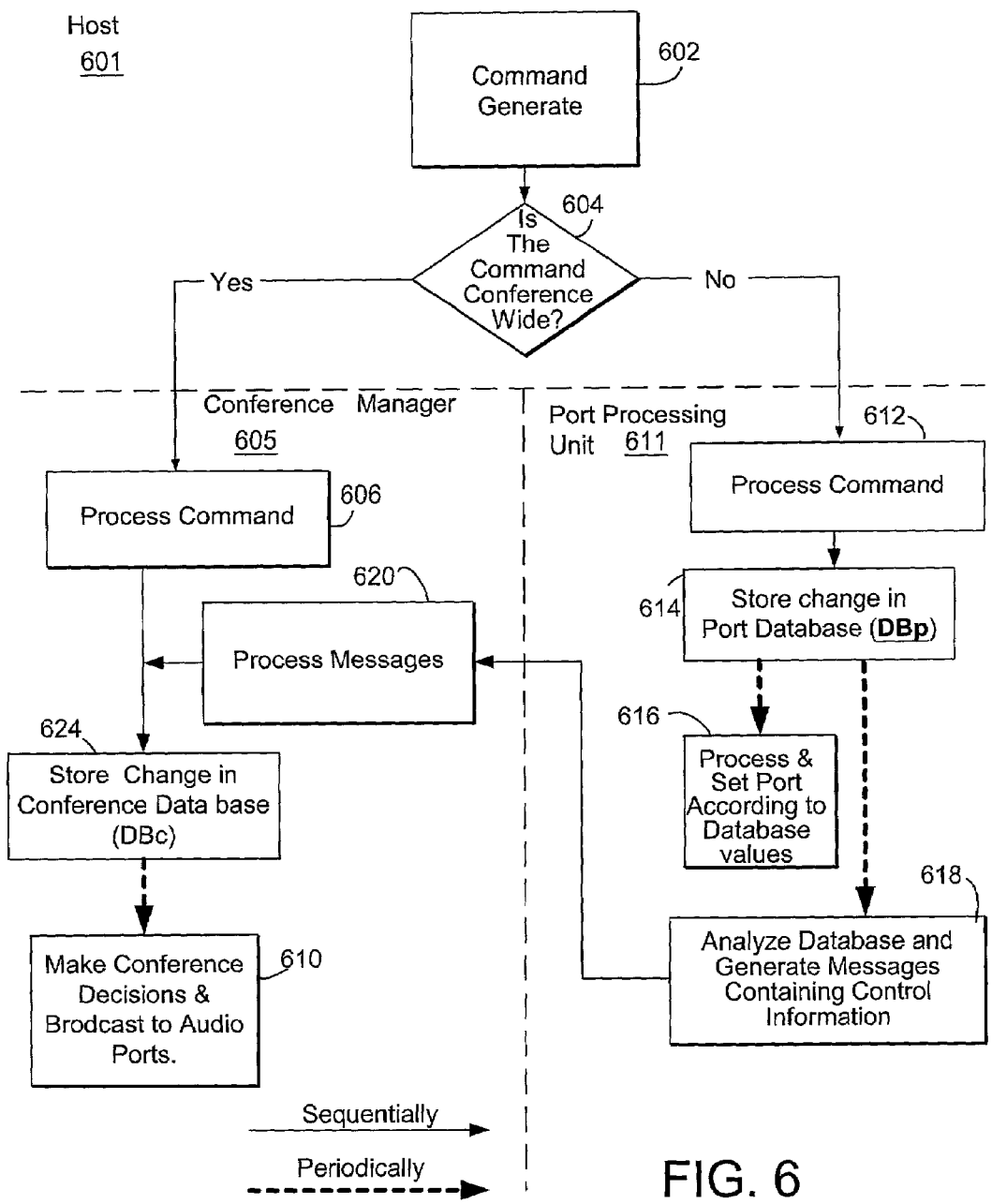
FIG. 6 is a flow diagram showing the steps of an exemplary embodiment of the present invention that illustrates the progress of commands from a host.

FIG. 6 is a flow diagram illustrating the processing of commands from a host 601. According to one embodiment of the present invention, the process comprises several sections: host section 601, a conference manager section 605, and a port processing unit section 611, which may be located in audio port 430 (not shown in FIG. 5). There are two types of host commands that are relevant to this part of the invention. One type is a conference oriented command, which includes commands such as open a conference, close a conference, etc. Another type is a port oriented command, such as open a port, close a port, mute, etc.

In step 602, host 601 generates a command. In step 604, host 601 checks the type of command. If the command is conference oriented (conference wide), the command is transferred to and processed by conference manager 605, which could be audio controller 440, and the method proceeds to step 606. If the command is port oriented, it is transferred to port processing unit 611 in the appropriate audio port 430, where the command is processed by port processing unit 611 (not shown in FIG. 5), and the method proceeds to step 612.

In step 606, the command is processed by audio controller 440. The result of the processing is stored, in step 624, in a conference database (conference database DBc may be part of data base 441), thereby changing the contents of the conference database (DBc). In step 610, the contents of conference database DBc are used by audio controller 440 to make conference decisions, such as closing the conference or adjusting the relative volume of various participants of the conference. Also, in step 610 audio controller 440 transfers the decisions as commands to the appropriate audio ports 430. Step 610 may be a subroutine that is performed once every several milliseconds, for example. Step 610 may be performed simultaneously with any of or all of the other steps of the process of FIG. 6.

In step 612, audio port 430 processes the command using port processing unit 611 and stores, in step 614, the new port state in the port database (DBp) (not shown in FIG. 5), thereby changing the contents of DBp. In step 616, the new port state is processed by port processing unit 611 according to the values in DBp, thereby setting audio port 430 into a new state. In step 618, port processing unit 611 retrieves the data from the database, DBp, the database, DBp, which is analyzed by port processing unit 611 and messages are generated containing control information. Also, in step 618, the relevant information is broadcast or sent to audio controllers 440, thereby transferring the data from port processing unit 611 to conference manager 605. This step may be done every period of time, and in some of the occasions there is no need to send any information. Step 618 may be a subroutine that is performed every several milliseconds. In step 620, audio controller 440 processes control information and stores, in step 624, the results in DBc, thereby changing the contents of DBc and bringing the method to step 610, described above.

In step 616 port processing unit 611 retrieves the data from DBp and only then performs the changes on the port itself. Step 616 may be performed periodically, for example once during each timing period, and in some of the occasions there is no need to change anything in the setting of the port. Step 616 does not necessarily need to wait for step 614 to occur, but rather may be performed periodically to check the DBp. In an embodiment step 616 may only reprocess the port if a change occurs in the database. In another embodiment step 616 may process the port no matter whether or not a change occurred in the database, because even if no change occurred, reprocessing the port will not result in a change of the port. Step 616 may be a subroutine that is performed once every several milliseconds, for example. Step 616 may be performed simultaneously with any of or all of the other steps of the process of FIG. 6.

Steps 612, 616 and 618 may occur at different times, and therefore the DBp stores the data between those steps and/or subroutines so that it can be reused.

For example, if a "MUTE" command is sent from the host to the appropriate audio port 440, port processing unit 611 of audio port 440 processes the command (step 612) and stores the status of the port as MUTE. At step 616 when port processing unit 611 reads the new data (e.g., that the port is in a mute state), port processing unit 611 has nothing to do or change in the operation of the port itself. However, in step 618 when port processing unit 611 reads the new status, (e.g., that the port is in mute) port processing unit 611 has to send control information to audio controller 440 which in turn will instruct all the audio ports 430 that are associated with audio controller 440 to remove it from their mixing streams, which means that their respective switches 532 will not select the stream of that audio port 430 from SFCI 526.

Figure 7:
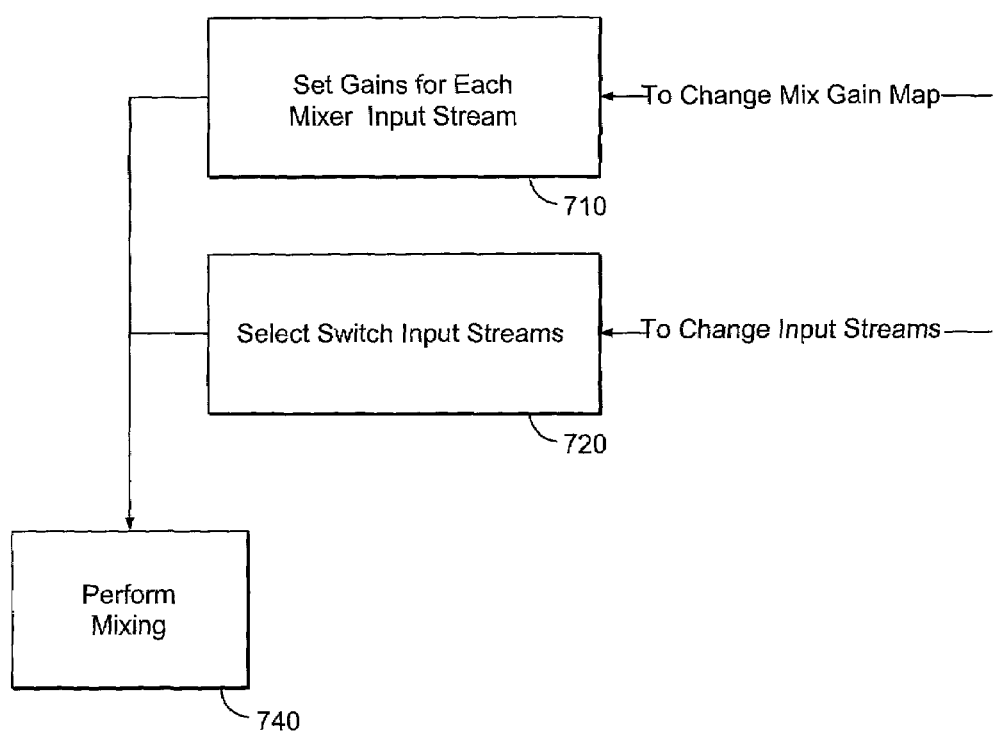
FIG. 7 is a flowchart of method steps for controlling gain of a mixed signal, according to one embodiment of the invention.

FIG. 7 is a flow diagram illustrating an example of the method of gain control of mixed signal 544 (FIG. 5). In step 710, the host (not shown) sets the gain of each channel 541 of mixer 542 (FIG. 5). During a conference, at step 720, audio controller 440 (FIGS. 4 and 5) using CCI 530 and control buffer 552 dynamically change the setup of switch 532 (FIG. 5). By controlling the state of switch 532 audio controller 440 may route a certain participant to the appropriate channel of mixer 542 with the appropriate gain for mixing in step 740. A benefit of this mechanism for dynamically changing switch 532 is the ability to change stream gain level according to a predefined policy of the conference by rerouting the participant to a channel of a different gain as a result of conference dynamics, such as a change in the lecturer or a change in which person is recognized by the speaker to ask questions.

Figure 8:
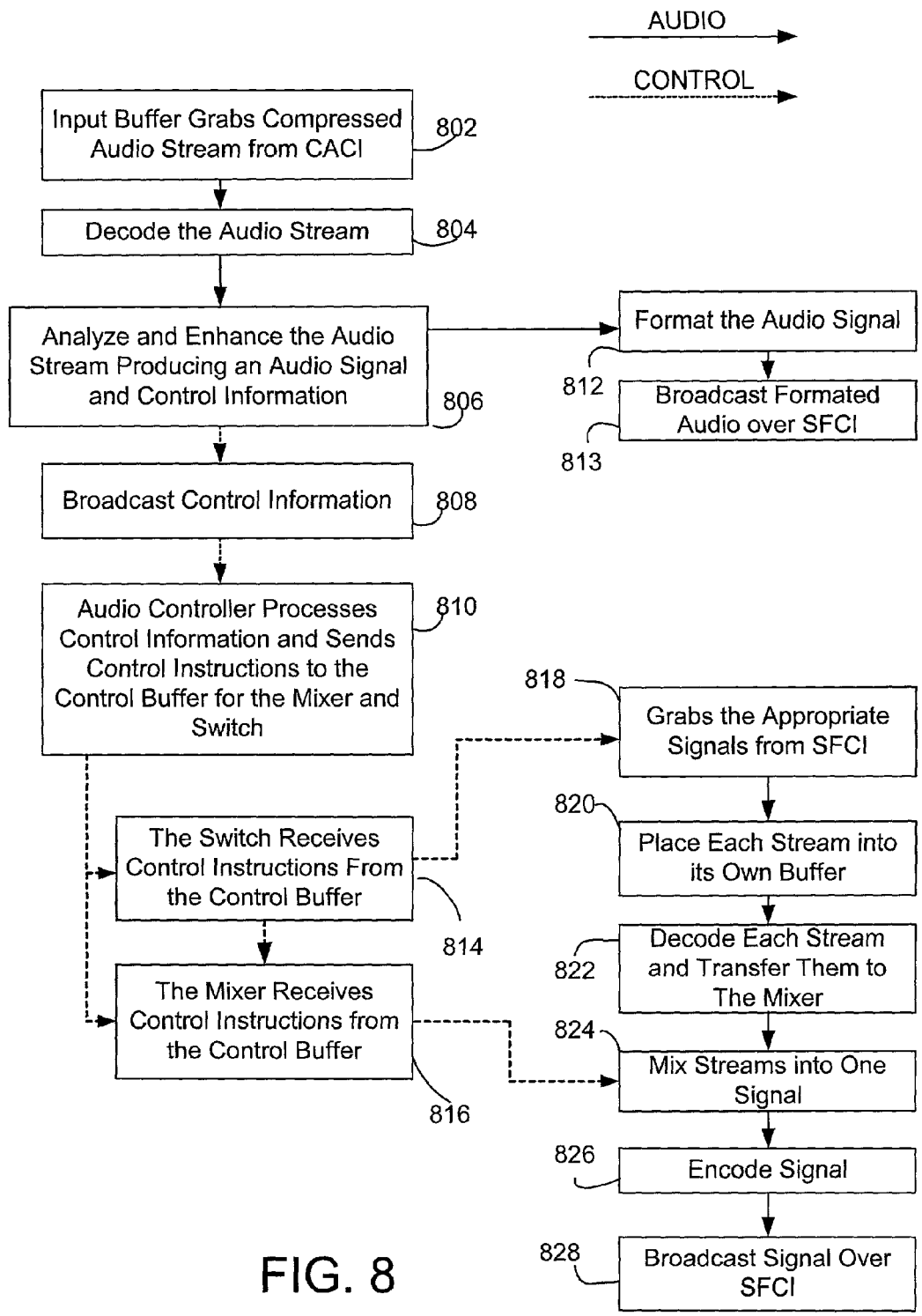
FIG. 8 is a flowchart of the operation of the system of FIG. 5.

FIG. 8 is a flowchart of the operation of the system of FIG. 5. In step 802 input buffer 504 grabs audio stream 502 (which may be compressed) from CACI 524. In step 804, decoder 506 decodes audio stream 502 based on the compression standard used by the endpoint associated with audio port 430, and transfers decoded audio stream 508 to analyze and enhance unit 510. In the case that audio stream 502 is not compressed decoder 506 may be bypassed.

In step 806, analyze and enhance unit 510 analyzes decoded audio stream 508 using algorithms such as DTMF detection and VAD. Analyze and enhance unit 510 also enhances decoded audio stream 508, including but not limited to noise reduction, echo cancellation and DTMF suppression. Analyze and enhance unit 510 produces two types of outputs, which are control information 514 going to information buffer 516 and enhanced audio signal 512 going to system format encoder 518. Control information 514 is sent via information buffer 516 to IC 528.

In step 808, IC 528 broadcasts control information 514, which may include control indications and commands of audio ports 430, for example, to audio controller 440 (FIG. 4). In step 810, audio controller 440 processes control information 514 and sends control instructions 554 via CCI 530, which may be in the form of commands, to control buffer 552, where control instructions 554 are stored until being received by switch 532 and/or mixer 542.

In step 812, enhanced audio signal 512 from analyze and control unit 510 is formatted by system format encoder 518. System format encoder 518 processes enhanced audio signal 512 according to the type of SFCI 526. For example, if SFCI 526 is a TDM bus, system format encoder 518 may divide enhanced audio signal 512 into time slots, which are assigned to this audio port 430. In the case that SFCI 526 is a packet based bus, system format encoder 518 may add a tag and/or several fields onto enhanced audio signal 512. Some examples of fields that system format encoder 518 may add to enhanced audio signal 512 are any one of, any combination of, or all of a header with the participant's name, the actual results from analyze and enhance unit 510, the connection status from the host (not shown), the ID number of audio port 430 of audio module 410, and/or the identification of the output data from buffer 522. System format encoder 518 may compress enhanced audio signal 512 into a system format, which may be proprietary (lossy or lossless) or standard (such as G.711, or Huffman coding). In step 813, system format encoder 518 broadcasts system formatted audio stream 520 through output buffer 522 to SFCI 526.

In step 814, switch 532 receives control instructions 554 from control buffer 552. Switch 532 retrieves the appropriate selected signals 531 from SFCI 526 based on control instructions 554 (or commands) from the audio controller 440. Selected signals 531 are formatted audio streams 520 of this and/or other audio ports 430. The output of switch 532, which may include multiple streams, corresponds to an endpoint (not shown) selected to be part of the audio mix. In step 816, mixer 542 receives control instructions 554 from control buffer 552 that set the gain of each channel.

In step 818, switch 532 grabs formatted audio signals 520 from SFCI 526 according to control instructions 554 from control buffer 552 during step 814. In step 820, each stream 536 is placed into its own buffer within bank of buffers 534. Streams 536 are transferred via bank of buffers 534 to system format decoders 538, where, in step 822, system format decoders 538 decode or decompress each stream and then transfer each decoded stream to mixer 542. The operation of system format decoder 538 may be the inverse operation of system format encoder 518.

In step 824, mixer 542 mixes its input streams (streams 536) into one signal (mixed signal 544) according to the gain parameters received in step 816, and sends mixed signal 544 to encoder 546. In step 826, encoder 546 encodes mixed signal 544 according to the compression standard of the endpoint associated with this port, and sends it to buffer 550 as compressed mixed signal 548. In step 828, CACI 524 broadcasts compressed mixed signal 548, which it received from buffer 550.

Figure 9:
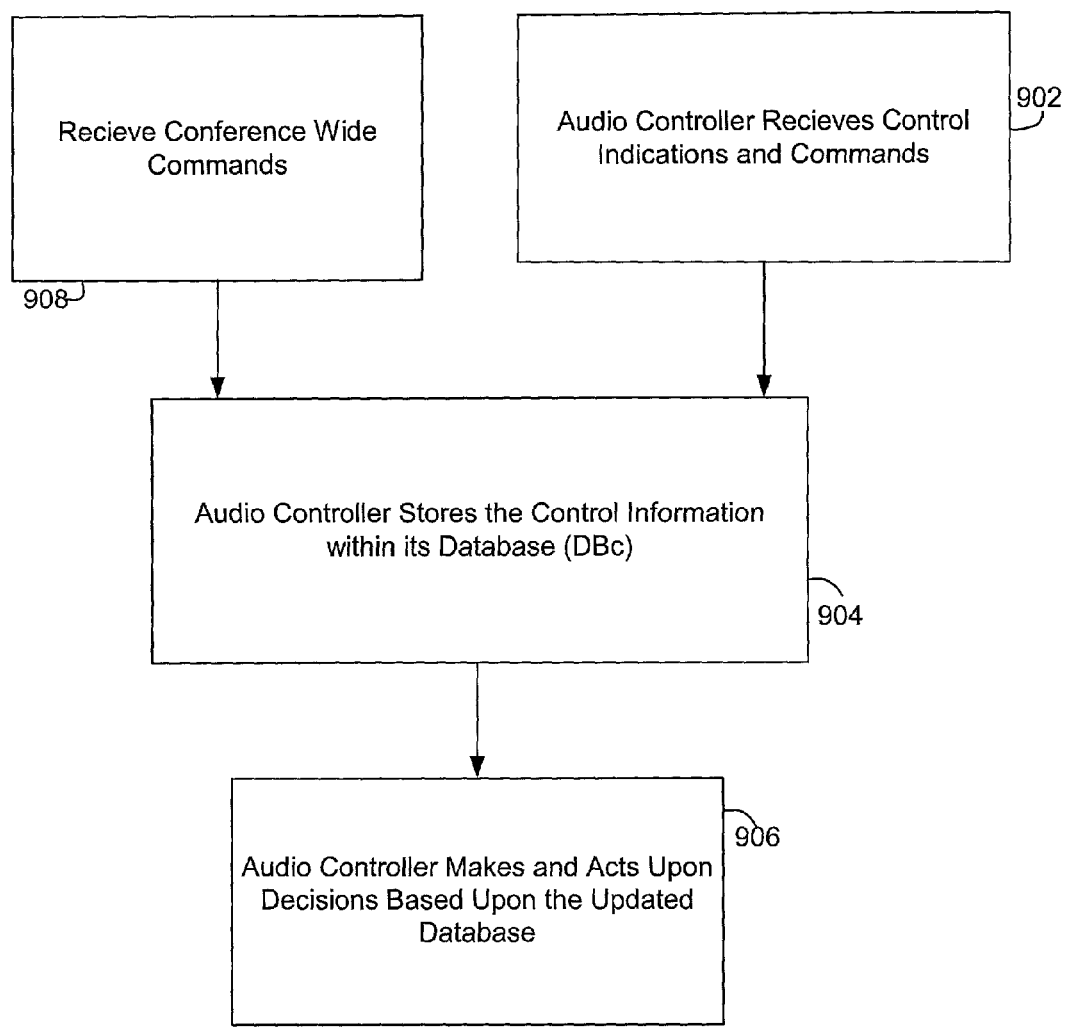
FIG. 9 is a flowchart showing the operation of an audio controller according to the invention.

FIG. 9 is a flowchart showing the operation of audio controller 440. FIG. 9 elaborates on processing step 810 of FIG. 8. In step 902, audio controller 440 receives control indications and commands (control information 514) from audio ports 430 via IC 528 within MCU 400. In addition, in step 908 audio controller 440 receives conference wide commands from the host (not shown) such as "open conference," "change conference parameters," and "close conference." In step 904, audio controller 440 stores control information 514 in database 441. In step 906, audio controller 440 makes and acts upon decisions that are based on updated database 441, conference by conference. Step 908 can be performed in parallel with, before, or after steps 902, 904 and 906. However, during the initial cycle step 908 should be performed before step 902 to open the conference. Conference wide commands such as "open conference" and "close conference" start and end the conference. Consequently, step 908 is both the start and end of the flowchart of FIG. 9.

For example, when processing a conference in which all participants have the same status, in step 902 audio controller 440 receives control information 514 via IC 528 from audio ports 430. In step 904, audio controller 440 updates database 441 based on control information 514. In step 906, audio controller 440 searches database 441 for the dominant speaker or a set number of the dominant speakers in the conference. For example, the dominant speaker may be a lecturer or a panelist in a round table discussion. The conference may be configured such that the dominant speaker is heard the loudest. Also, in step 906, audio controller 440, via control instructions 554, controls switch 532 of each audio port 430 being used for the conference to generate an appropriate mix.

There are many possible variations that take advantage of the architecture of various embodiments of the present invention. In an embodiment, the system is configured to remove fragmentation by allocating free audio ports to an existing and/or a new conference periodically or continually and/or upon initiating a conference. In an embodiment, the system is configured so that if a new participant enters the conference, the system checks for a free audio port. As long as there is a free audio port anywhere in the system the system adds the new participant to any conference requested. The system may dynamically reroute one or more participants to different audio ports, if necessary. In an embodiment, the system is configured to set up a requested conference as long as the size of the requested conference is anywhere between zero to the number of free ports in the system. This feature can be achieved since there is no central CACP 204 as a conference entity, which performs audio signal processing along with conference control. Instead the audio signal processing of CACP 204 is distributed among the audio ports 430. Each audio port 430 performs the audio signal processing for its associated endpoint. In an embodiment, the system is configured to set up a conference as long as there are free audio ports to be allocated to the participants of the conference. The free audio port can be anywhere in the system.

In embodiments in which audio signal processing is done inside each audio port, the audio propagation path in the system may be reduced, thereby reducing audio delay when compared to embodiments in which part of the audio signal processing is performed in a central audio processor like CACP 204.

In an embodiment, each audio port 430 may be an autonomous entity that can be packaged into one physical chip as resources allow. In embodiments in which sharing is performed through a common interface, audio ports 430 may be placed on the same chip or in different modules (cards) and may be configured to behave the same as one another.

In embodiments using processed information rather than performing the actual analysis of the audio streams the computational load on the audio controller is lower than if audio controller 440 was performing the actual analysis. In an embodiment, audio controller 440 can be configured to process control information 514 and not audio streams 512, thereby lowering I/O load on audio controller 440, because control information 514 requires less bandwidth than audio streams 512. The extra computational power and/or other resources available when audio controller 440 is used to process control information 514 and not audio streams 512 can be dedicated to conference management.

In an embodiment, participants control management (the management is participant oriented) by directing commands to the corresponding audio port 430 and not by directing the commands to units that are affected by the command. This process can be used to simplify system management and reduce the number of needed commands as compared to other ways of orientating management. For example, to mute a certain participant, a mute command may be sent to the participant's audio port 430 and via IC 528 to all audio controllers 440. Each audio controller 440, in turn, will remove the signal of the participant from all switches 532 within the same audio module.

In the description and claims of the present application, each of the verbs, "comprise" "include" and "have," and conjugates thereof, are used to indicate that the object or objects of the verb are not necessarily a complete listing of members, components, elements or parts of the subject or subjects of the verb.

Alternate embodiments will become apparent to those skilled in the art to which the present invention pertains without departing from its spirit and scope. Accordingly, the scope of the present invention is described by the appended claims and supported by the foregoing description.

What is claimed:

1. A system, comprising:
   a plurality of audio ports between which audio signal processing of a conference is distributed, wherein each audio port is assigned to one of a plurality of endpoints and each audio port processes input audio signals from its assigned endpoint and processes output audio signals to be sent to its assigned endpoint; and
   one or more audio controllers, wherein the one or more audio controllers receive control information from each of the audio ports as derived from the processed input audio signals and provide control instructions to each of the audio ports to control processing of the output audio signals, wherein the audio controller does not otherwise receive or process the audio signals.

2. The system of claim 1, wherein the processing of output audio signals includes mixing of at least one audio signal.

3. The system of claim 2, further comprising a switch that selects which audio signals will be mixed, and that is controlled by the one or more audio controllers.

4. The system of claim 1, wherein the processing of input audio signals includes analyzing the input audio signals to derive the control information.

5. The system of claim 1, wherein the processing of input audio signals includes enhancing the input audio signals.

6. The system of claim 1, wherein the one or more audio controllers are centralized and distinct from the plurality of audio ports.

7. The system of claim 1, wherein processing of output audio signals includes use of an encoder encoding the output audio signals.

8. The system of claim 7, further comprising a common interface that receives output from the encoder.

9. The system of claim 1, wherein the audio ports further comprise control buffers for storing the control information and the control instructions.

10. The system of claim 1, further comprising a control channel interface for broadcasting the control instructions from the one or more audio controllers to the audio ports.

11. The system of claim 1, further comprising an information channel for broadcasting the control information from the audio ports to the one or more audio controllers.

12. The system of claim 1, wherein the processing of input audio signals includes use of an analyze and enhance unit, wherein the analyze and enhance unit produces the control information.

13. The system of claim 1, wherein the processing of input audio signals includes decoding the input audio signals.

14. The system of claim 1, further comprising an interface common to the audio ports for carrying compressed input audio signals to audio ports.

15. The system of claim 14, wherein the common interface further carries the output audio signals to the endpoints.

16. A system, comprising:
    a plurality of audio ports between which audio signal processing of a conference is distributed, wherein each of the plurality of audio ports is assigned to one of a plurality of endpoints, and each audio port processes input audio signals from its assigned endpoint and processes output audio signals to be sent to its assigned endpoint, each of the plurality of audio ports comprising
      a decoder for decoding a compressed audio signal,
      an analyzer for deriving control information from the decoded audio signal,
      a mixer for mixing audio signals from other audio ports, and
      an encoder that encodes the audio signal mixed by the mixer,
    an information channel for receiving the control information from the audio ports;
    one or more audio controllers for receiving the control information from the information channel and for deriving mixing control instructions;
    a control channel for sending the mixing control instructions to the mixers; and
    a system interface for sharing the decoded audio signals between the audio ports.

17. The system of claim 16, further comprising a common interface coupled to the audio ports, the common interface for carrying the compressed audio signals to the decoder and for receiving the encoded audio signals from the encoders.

18. The system of claim 16, further comprising:
    a system format encoder between the analyzer and the system interface, wherein the system format encoder encodes the decoded audio signal with a system format; and
    a system format decoder between the system interface and the mixer, wherein the system format decoder removes the system formatting.

19. The system of claim 16, wherein the analyzer also enhances the decoded audio signal.

20. A control unit for facilitating multipoint communication between a plurality of endpoints, comprising:
    a plurality of audio ports each assigned to one of the plurality of endpoints, wherein each audio port processes input audio signals from its assigned endpoint and processes output audio signals to be sent to its assigned endpoint, and each audio port is capable of:
- decoding compressed audio signals from its associated endpoint,
- broadcasting the decoded audio signal from its associated endpoint to others of the plurality of audio ports,
- mixing received broadcasted decoded audio signals from others of the plurality of audio ports, and
- compressing the mixed audio signals for output to its associated endpoint; and at least one audio controller for receiving control information from each of the audio ports derived from the decoded input audio signals and for providing control instructions to each of the audio ports to select which of the broadcasted received decoded audio signals are to be mixed, wherein the audio controller does not otherwise receive the input audio signals.

21. The control unit of claim 20, wherein the audio ports are further capable of enhancing the decoded audio signal.

22. The control unit of claim 20, wherein the audio port further comprises:
- a system format encoder for encoding the decoded audio signal with a system format prior to broadcasting; and
- a system format decoder, wherein the system format decoder removes the system format from the broadcasted received decoded audio signals prior to mixing.

23. The control unit of claim 20, wherein there is only one audio controller.

24. A control unit for facilitating multipoint communication between a plurality of endpoints, each endpoint being operative to send a compressed input audio signal to the control unit and receive a compressed output signal from the control unit, the control unit comprising:
- a plurality of audio modules, each audio module receiving compressed input audio signals from at least one endpoint and sending compressed output audio signals to at least one endpoint, each audio module including
  - at least one audio port, each audio port being assigned to an endpoint within a conference and being operative to handle audio signal processing including decoding of the input audio signal of its assigned endpoint and mixing of the output audio signal to be sent to its assigned endpoint;
  - at least one audio controller for receiving control information from each of the plurality of audio ports as derived from the decoded input audio signals and providing to each of the plurality of audio ports control instructions for controlling the mixing; and
  - an interface to route the decoded input audio signals between audio modules without passing through the audio controller, wherein the audio controller does not otherwise receive the input audio signals.

25. The control unit of claim 24, wherein the audio port comprises:
- a decoder for decoding the compressed input audio signal of its endpoint;
- an analyzer for assessing the decoded input audio signal and sending the decoded audio signal to the interface;
- a switch that selects from the interface decoded audio signals from a subset of the audio ports;
- a mixer that mixes the selected decoded audio signals; and
- an encoder that encodes an output signal of the mixer to form the output audio signal to be sent to its endpoint.

26. The control unit of claim 25, wherein the analyzer further enhances the decoded audio signal.

27. The control unit of claim 25, wherein the audio port further comprises:
- a system format encoder between the analyzer and the interface, wherein the system format encoder encodes the decoded audio signal with a system format; and
- a system format decoder between the interface and the mixer, wherein the system format decoder removes the system format from the selected decoded audio signals prior to arrival at the mixer.

28. The control unit of claim 24, wherein there is only one audio controller.

29. A method for distributed audio signal processing of a conference between a plurality of audio ports, comprising:
- receiving an audio signal from an endpoint at each of the plurality of audio ports, wherein each of the audio ports is assigned to one of plurality of endpoints, and each audio port processes input audio signals from its assigned endpoint and processes output audio signals to be sent to its assigned endpoint;
- analyzing the audio signal at each audio port to generate control information;
- broadcasting the audio signals to the plurality of audio ports;
- broadcasting the control information from the audio parts to one or more audio controllers; and
- mixing at each audio port a subset of the broadcasted audio signals in accordance with control instructions from the one or more audio controllers as governed by the control information.

30. The method of claim 29, wherein only one audio controller is used.

31. The method of claim 29, further comprising encoding the mixed audio signals at each audio port.

32. The method of claim 29, further comprising decoding the received audio signals at each audio port.

33. The method of claim 32, wherein decoding proceeds the analysis of the audio signal.

34. The method of claim 29, wherein the received audio signals and mixed audio signals share an interface common to the audio ports.

35. The method of claim 29, wherein broadcasting the audio signals to the plurality of audio ports comprises broadcasting to an interface common to all of the audio ports.

36. A method, comprising:
- receiving a compressed audio signal from an endpoint at each of a plurality of audio ports, wherein each of the audio ports is assigned to one of a plurality of endpoints, and each audio port processes input audio signals from its assigned endpoint and processes output audio signals to be sent to its assigned endpoint;
- decoding the compressed audio signal at each audio port;
- analyzing the decoded audio signal and generating control information;
- broadcasting the decoded audio signals to the plurality of audio ports;
- broadcasting the control information from the audio ports to one or more audio controllers;
- mixing at each audio port a subset of the broadcasted decoded audio signals in accordance with control instructions from the one or more audio controllers as governed by the control information; and
- encoding output of the mixing at each audio port for distribution to at least one endpoint.

37. The method of claim 36, further comprising enhancing the decoded audio signal prior to broadcasting to the plurality of audio ports.

* * * * *